(12) United States Patent
Lin

(10) Patent No.: US 6,331,902 B1
(45) Date of Patent: Dec. 18, 2001

(54) SYSTEM AND METHOD FOR DIGITAL COLOR IMAGE PROCESSING

(75) Inventor: Bob Chih-Ming Lin, Newport Beach, CA (US)

(73) Assignee: Match Lab, Inc., Irvine, CA (US)

(*) Notice: Subject to any disclaimer, the term of this patent is extended or adjusted under 35 U.S.C. 154(b) by 0 days.

(21) Appl. No.: 09/418,956

(22) Filed: Oct. 14, 1999

(51) Int. Cl.[7] ...................................................... B41B 1/00
(52) U.S. Cl. ............................ 358/1.9; 358/528; 358/525
(58) Field of Search ........................... 358/1.9, 1.2, 1.16, 358/518, 523, 524, 525, 528, 534; 382/162, 167

(56) References Cited

U.S. PATENT DOCUMENTS

| | | | |
|---|---|---|---|
| 4,878,126 | 10/1989 | Ichikawa | 358/451 |
| 4,920,571 | 4/1990 | Abe et al. | 382/47 |
| 5,018,085 | 5/1991 | Smith, Jr. | 364/526 |
| 5,175,804 | * 12/1992 | Wittman | 395/108 |
| 5,200,840 | 4/1993 | Koike et al. | 358/451 |
| 5,237,432 | * 8/1993 | Calaraco et al. | 358/451 |
| 5,335,295 | 8/1994 | Ferracini et al. | 382/47 |
| 5,335,296 | 8/1994 | Larkin et al. | 382/47 |
| 5,400,154 | 3/1995 | Takayama et al. | 358/525 |
| 5,432,892 | * 7/1995 | Hafner et al. | 395/131 |
| 5,521,640 | * 5/1996 | Prater | 348/273 |
| 5,535,007 | 7/1996 | Kim | 358/296 |
| 5,729,357 | 3/1998 | Funada et al. | 358/451 |
| 5,748,176 | 5/1998 | Gondek | 345/131 |
| 5,768,482 | * 6/1998 | Winter et al. | 395/109 |
| 5,847,714 | 12/1998 | Naqvi et al. | 345/439 |
| 5,861,962 | 1/1999 | Maeda | 358/451 |
| 5,867,634 | 2/1999 | Hirota et al. | 358/1.2 |

* cited by examiner

Primary Examiner—Kimberly A. Williams
(74) Attorney, Agent, or Firm—Sheldon & Mak

(57) ABSTRACT

A pipeline processor for scaling and converting RGB color input images to CMYK at a magnification specifiable in 1 percent increments up to 400% includes a scaler having predefined main scale factors including one at maximum scale. An interim scale factor is selected from the main scale factors as one nearest the specified magnification toward the high end of the range. A pixel transformation is made at the interim scale factor between a subset of the source pixels and a corresponding subset of intermediate pixels using hardware circuits. The intermediate pixels are then interpolated to produce a scaled image by dropping an evenly spaced subset of the intermediate pixels when the magnification is less than the interim scale factor. A set of enhanced pixels is derived from the scaled image by proportionally weighting center pixels against average values of diagonally neighboring pixels. Color conversion is done by multiplex addressing of a lookup table using high-order portions of RGB values and incremented values to obtain sets of neighboring CMYK values. Conversion is completed by interpolating between the neighboring values using low-order portions of the RGB values. Halftone output data is obtained from comparisons of 8-bit pixel values with halftone pattern values from another lookup table that is addressed by pixel and line counters. Also disclosed is a method for scaling an image defined by an array of source pixels to produce an array of output pixels according to a received scale factor.

19 Claims, 5 Drawing Sheets

SYSTEM AND METHOD FOR DIGITAL COLOR IMAGE PROCESSING

BACKGROUND

The present invention relates to digital image processing including scaling and color conversion of RGB signals to CMYK format, such as for printing high quality images from digital cameras and the like.

In the processing of graphic images, it is often desired or required to alter the magnification. Traditionally, optical means such as interchangeable lenses, zoom lenses, and mechanical positioners have been used on copy cameras and photo-copiers of the prior art. More recently, photo-copiers have incorporated linear sensor arrays that are sequentially and repetitively read in a main scan direction as the arrays are moved across the page in a sub-scan direction. Numerous systems have been developed for selectively changing the magnification electronically, such as by using a computer programmed with appropriate software. Such systems are prohibitively slow in many applications. U.S. Pat. No. 4,920,571 to Abe et al. discloses an image processor that incorporates an interpolator that uses look-up tables for adding image data in enlarging operations and selectively reducing the data in reducing operations. In one example, the magnification can range by $\frac{1}{64}$ ths from $\frac{32}{64}$ to $\frac{128}{64}$ (0.5–2.0). The processor of Abe et al. has the disadvantage of requiring a separate look-up table for each magnification. Thus it is ineffective in that it is capable of only a limited choice of magnifications; and/or it is overly complex, requiring a multiplicity of look-up tables.

U.S. Pat. No. 5,535,007 to Kim discloses a pipeline processor for enlarging or reducing an original image to obtain a copy image scaled in 1 percent increments, with sharpening and color conversion. The device includes means for inserting or removing pixel data in a main-scanning direction and inserting or omitting the scanning lines using separate look-up tables that are populated according to designated image input parameters and control factors that correspond to a desired magnification, which can typically range from 50% to 400%. Also disclosed are conversion from RGB to CMYK color formats by a CMY look-up table that feeds an under color removal (UCR) comparator and subtractor, and a color corrector that selectively substitutes converted color reference values for C, M, and Y, depending on a comparison of input data with respective register values. The processor of Kim, while enabling scaling in one-percent increments, has the disadvantage of having to populate the look-up tables for each different magnification, thereby adding complexity to the processor and slowing the process.

U.S. Pat. No. 5,867,634 to Hirota et al. discloses an image processor in which an image of a document is read by an image sensor, and a reduction ratio of the image is set. Matrix interpolation (for reducing magnifications) is then performed on the image data between a pixel under interest and pixels adjacent thereto as functions of the reduction ratio. Next, reduction/magnification is carried out by sequentially reading stored interpolation data at a read clock rate that is proportional to a write clock rate at which the interpolation data is stored. The data is read into eight smoothing filters that are configured for separate integer ranges of positive magnification, the data from one of the filters being selected as output depending on the actual magnification. Color conversion is done in stages, first in logarithmic conversion by table look-ups from reflective to density RGB values, followed by UCR/BP processing and color correction by matrix masking. The image processor of Hirota, unfortunately, is excessively complex, requiring a number of variable multiplication operations (including squaring) to be performed on multiple channels of data for each pixel to be processed. Also, the scaling subsystem effectively requires images to be greatly enlarged, then reduced.

Thus there is a need for an image processing system that overcomes the disadvantages of the prior art.

SUMMARY

The present invention meets this need by providing an image processing system having variable magnification by adapted bi-linear interpolation at one of a predefined set of scale factors, and dropping an equally spaced subset of pixels in cases of other scale factors. Optionally or alternatively, the system provides color conversion from RGB to CMYK with correction/matching using rectilinear interpolation. In one aspect of the invention, a system for scaling an input image defined by an array of source pixels to produce an array of scaled pixels includes a memory for storing the source pixels; means for receiving a scale factor within a range of specifiable scale factors; means for selecting an interim scale factor from a numerically spaced set of predefined main scale factors, the main scale factors being spaced from a low end of the range, one of the scale factors being at a high end of the range, the interim scale factor being that nearest the received scale factor in the direction of the high end of the range; means for determining, for the interim scale factor, a pixel transformation between a subset of the source pixels and a corresponding subset of intermediate pixel data as scale functions of source pixel values; means for producing the intermediate pixel data from the source pixels using the interim scale factor and corresponding scale functions; and means for interpolating the intermediate pixel data to produce the scaled pixels by dropping an evenly spaced subset of the intermediate pixel data when the received scale factor is less than the interim scale factor.

The range can be from not more than 10 percent to not less than 200 percent, there being at least 5 of the predefined scale factors. The received scale factor can be specifiable in 1 percent increments. The predefined scale factors can be spaced by not more than 25 percent for scale factors not exceeding 150 percent. The range can extend to 400 percent, the predefined scale factors including percentages of 25, 50, 75, 100, 125, 150, 200, 250, 300, and 400. The image can be a color image, each of the pixels having at least three color components. The color components can include red, green, and blue.

The subsets of source pixels can be square arrays having a source dimension selected from the set consisting of 1, 2, and 4, the subsets of intermediate pixel data being also square arrays having a destination dimension selected from the set consisting of 1, 2, 3, 4, and 5, the destination and source dimensions having a ratio matching the predefined scale factors. The destination and source dimensions can define the ratio as a reduced fraction. The functions can be of support subsets of the source pixels, each support subset including a corresponding source subset and having a support dimension being not more than one greater than the source dimension.

The system can further include means for enhancing the scaled image using a weighting factor applied to values of diagonally adjacent pixels of respective center pixels. The means for enhancing can include means for augmenting an initial value of the center pixel by an amount proportional to the weighting factor and diminishing the value of the center pixel by an amount proportional to an average value of the diagonally adjacent pixels. The weighting factor can be variable in response to external input.

In another aspect of the invention, a system for converting a color image defined by an array of source pixels having red, green, and blue color components to produce an array of output pixels, each of the output pixels having cyan, magenta, yellow and black components, includes: the memory for storing the source pixels; a 3-D lookup table containing CMYK values corresponding to respective RGB values; means for addressing the table with high-order value portions of the enhanced pixels to obtain corresponding sets of intermediate CMYK values, the addresses corresponding to high-order value portions of the RGB values, selectively incremented or unchanged to obtain neighboring high-order value portions,; and means for interpolating the intermediate CMYK values using respective low-order value portions of the scaled RGB pixels, comprising, for each CMYK channel, a circuit combining respective ones of the intermediate values of each set with the low-order value portions, selectively positively or negatively proportional for each of the RGB color components in different combinations for particular ones of the neighboring high-order value portions.

The means for addressing the lookup table can include a multiplexer having as inputs the high-order value portions of the RGB values, and further inputs being incremented counterparts of the high-order value portions, the multiplexer being sequenced between combinations of the value portions or the incremented value portions of each color component to obtain a plurality of addresses corresponding to the high-order value portions, each of the pluralities of addresses producing one of the sets of CMYK values.

In a further aspect of the invention, a method for scaling an image defined by an array of source pixels to produce an array of output pixels according to a received scale factor being within a specifiable range includes:

(a) storing the source pixels;
(b) selecting an interim scale factor from a numerically spaced set of predefined scale factors being spaced from a low end of the range, one of the scale factors being at a high end of the range, the interim scale factor being that nearest the received scale factor in the direction of the high end of the range;
(c) producing an intermediate pixel array by pixel transformations between subsets of the source pixels and corresponding subsets of intermediate pixel data using scale functions of source pixel values associated with the interim scale factor; and
(d) interpolating the intermediate pixel data when the received scale factor is less than the interim scale factor to produce the output pixels by dropping an evenly spaced subset of the intermediate pixel data.

The image can be a color image, the storing, producing, and interpolating being performed simultaneously for each of at least three color components of the image.

DRAWINGS

These and other features, aspects, and advantages of the present invention will become better understood with reference to the following description, appended claims, and accompanying drawings, where:

FIG. 3 is a block diagram of a scale channel portion of the RIP of FIG. 2;

FIG. 4 is a block diagram of an image enhancement channel portion of the RIP of FIG. 2;

DESCRIPTION

Figure 2:
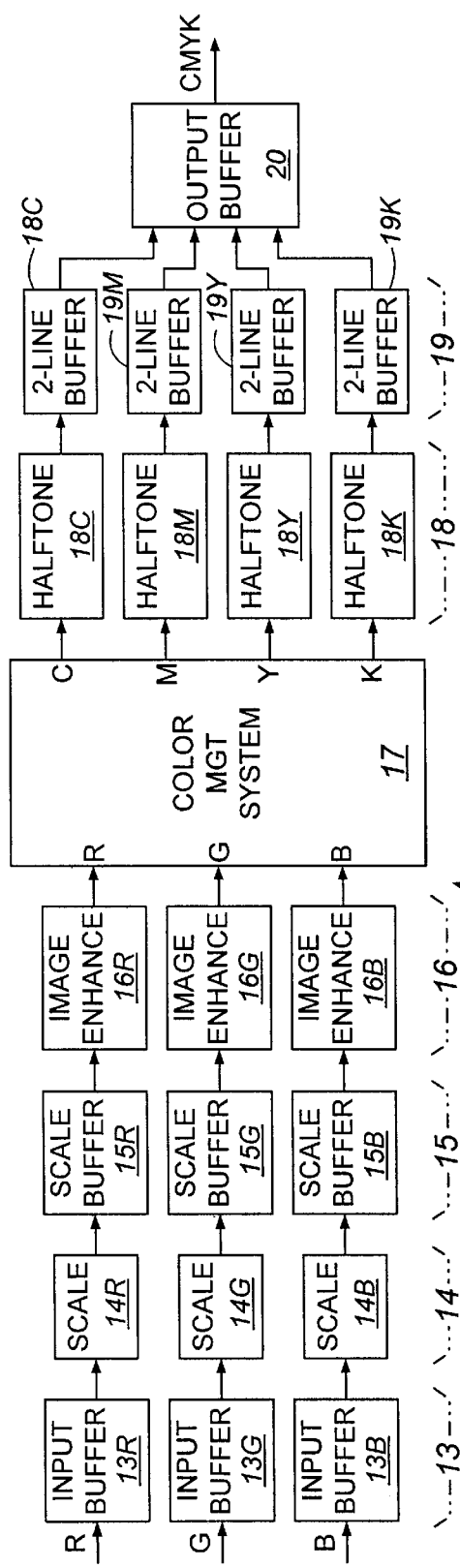
FIG. 2 is a simplified block diagram of a raster image processor (RIP) of the system of FIG. 1.
Figure 1:
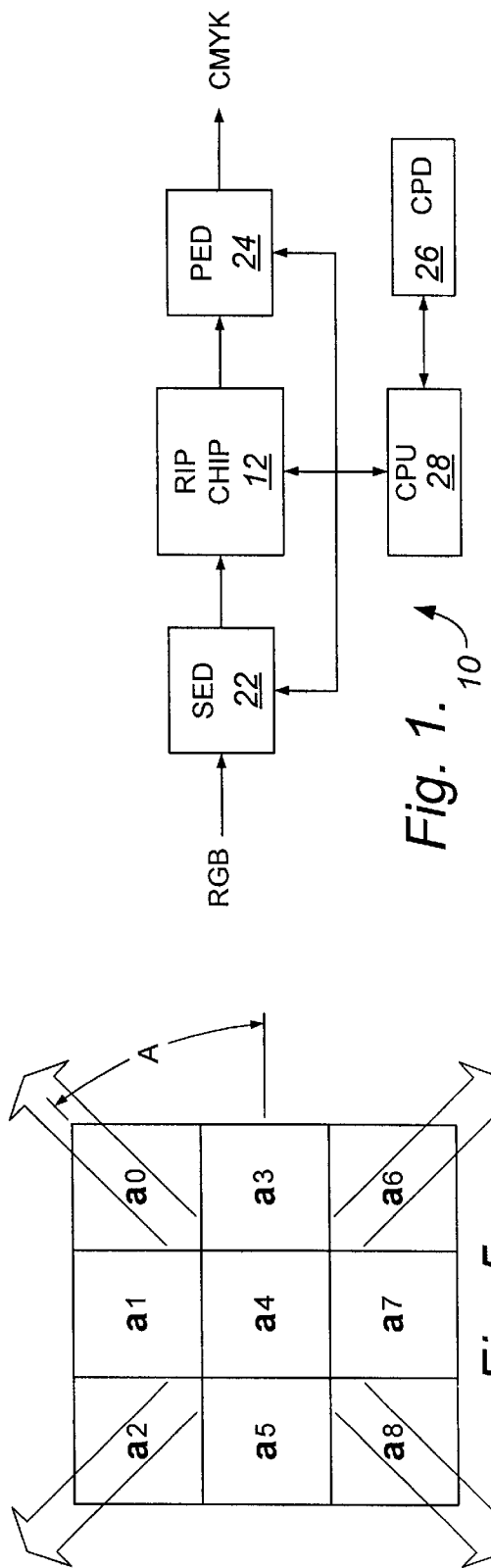
FIG. 1 is a main block diagram of a digital color image processing system according to the present invention.

The present invention is directed to a pipeline image processing system that is particularly effective in variably enlarging and reducing scanned images, and in providing high-quality CMYK printing output data from RGB scanned input. With reference to FIGS. 1–9 of the drawings, a color image processing system 10 according to the present invention includes a digital color Raster Image Processor (RIP) 12 having a memory input buffer 13 for receiving an input image in the form of source pixels, an image scaler 14, a scale buffer 15, an image enhancer 16, a color converter 17, a halftone generator 18, a halftone buffer 19, and a composite output buffer 20 for storing processed output pixels of the image to be printed or otherwise displayed. The input buffer, scaler, scale memory, and enhancer components each have respective RGB color channel portions, designated input buffer channels 13R, 13G, and 13B, scaler channels 14R, 14G, and 14B, scale memory channels 15R, 15G, and 15B, and enhancer channels 15R, 15GB, and 15BC. Similarly, the halftone generator and halftone buffer components each have respective CMYK color channel portions, designated halftone generator channels 18C, 18M, 18Y, and 18K, and halftone buffer channels 20C, 20M, 20Y, and 20K. FIG. 2 shows the input buffer 13, the scaler 14, the scale memory 15, the enhancer 16, the color converter 17, the halftone generator 18, the halftone memory 19, and the output buffer 20 being series-connected for pipeline data flow whereby a continuous data stream is simultaneously processed in sequence by the above-identified elements yet each element operates independently of propagation delays associated with other elements. The RIP 12 is preferably implemented as an application-specific integrated circuit, and is therefore also sometimes referred to as RIP On a Chip (ROC™). As shown in FIG. 1, the ROC-based system 10 also includes a scanner engine driver (SED) 22, a printer engine driver (PED) 24, a control panel driver (CPD) 26, and a central processor unit (CPU) 28 that has additional memory (not shown) associated therewith in a conventional manner. FIG. 1 also shows data flow in the system 10 through the ROC 12 by rightwardly oriented arrows, and control signal flow relative to the CPU 28 by vertically oriented arrows.

Using hardware operating at 100 Mhz, performance of the system 10 configured as described herein has been established at 10 letter size pages per minute (PPM) at a resolution of 600 dpi, individual pixels being processed at a rate of $8.5 \times 11 \times 600 \times 600 \times 10/60 = 5.6$ M pixel/sec.

Scaling

The image scaler 14 enlarges or reduces color images in realtime at a minimum scaling step of 1% by using adapted bi-linear interpolation and equal distance pixel elimination.

The scaler 14 produces predefined main enlarge and reduce magnifications of 25%, 50%, 75%, 125%, and 150%, 200%, 250%, 300%, and 400% in the adapted bi-linear interpolation. For any other percentage, equal distance pixel elimination is performed by the scaler 14 as described below. It will be understood that each image can have horizontal and vertical scaling at different percentages, known in the art as asymmetric scaling.

For each color channel (red, green, or blue), contiguous subsets of the a square area of (n+1)×(m+1) pixels are obtained from the input buffer 13. In an exemplary configuration of the present invention, each color channel has up to 16 bits per pixel. Each square is further divided into 16×16 grids. All of the new interpolated pixels are calculated as approximations of the 16×16(=256) grids.

In the adapted bi-linear interpolation, for the appropriate one of the above-listed scaling percentages, each resulting pixel value is calculated by a simple multiplication of preferably up to four selected neighbor pixel values by respective predetermined weighting factors P, the results being added together and divided by 256, 256 also being the sum of the weighting factors. It will be understood that the final division by 256 is done simply by shifting the resulting sum 8 bits to the right.

In an arbitrary example having a resulting pixel determined by four neighbor pixels (a1, a2, a3, a4) of values a1=180, a2=190, a3=200, a4=100, the respective factors being 2, 5, 6, and 15 (totaling only 28 for simplicity), the resulting pixel value is (2*a1+5*a2+6*a3+15*a4)/256= 4010/256=15. In the exemplary configuration of the scaler 14, binary arithmetic is employed with 8-bits of the input pixel values being used, the factors also having 256 possible values (0–255), and the sum of the results is limited to 16 bits by virtue of the sum of the factors being only 256. Thus the resulting pixel value in the exemplary configuration is limited to 8-bits.

In the following scaling formulas, the (n+1)×(m+1) original pixel data are represented in the following form:

$$a(0,0), a(0,1), \ldots a(0,n)$$
$$a(1,0), a(1,1), \ldots a(1,n)$$
$$\ldots$$
$$a(m,0), a(m,1), \ldots a(m,n)$$

and the new or resulting pixels (p+1)×(q+1) are represented as follows:

$$b(0,0), \ldots, b(0,p)$$
$$\ldots$$
$$b(q,0), \ldots, b(q,p)$$

When the main magnification is 25%, the original pixel size is 4×4 and the new pixel size is 1×1:

$$b(0,0)=[255*a(0,0)+a(0,1)]/256$$

When the main magnification is 50%, the original pixel size is 2×2 and the new pixel size is 1×1:

$$b(0,0)[255*a(0,0)+a(0,1)]/256$$

When the main magnification is 75%, the original pixel size is 4×4 and the new pixel size is 3×3:

$$b(0,0)=[255*a(0,0)+a(0,1)]/256$$
$$b(0,1)=[160*a(0,1)+96*a(0,2)]/256$$
$$b(0,2)=[96*a(0,2)+160*a(0,3)]/256$$
$$b(1,0)=[160*a(1,0)+96*a(2,0)]/256$$
$$b(1,1)=[100*a(1,1)+60*a(1,2)+60*a(2,1)+36*a(2,2)]/256$$
$$b(1,2)=[60*a(1,2)+100*a(1,3)+36*a(2,2)+60*a(2,3)]/256$$
$$b(2,0)=[160*a(2,0)+96*a(3,0)]/256$$
$$b(2,1)=[60*a(2,1)+36*a(2,2)+100*a(3,1)+60*a(3,2)]/256$$
$$b(2,2)=[36*a(2,2)+60*a(2,3)+60*a(3,2)+100*a(3,3)]/256$$

When the main magnification is 125%, the original pixel size is 4×4 (with 5×5 neighbor pixels needed for support) and the new pixel size is 5×5:

$$b(0,0)=[255*a(0,0)+a(0,1)]/256$$
$$b(0,1)=[64*a(0,0)+192*a(0,1)]/256$$
$$b(0,2)=[96*a(0,1)+160*a(0,2)]/256$$
$$b(0,3)=[160*a(0,2)+96*a(0,3)]/256$$
$$b(0,4)=[192*a(0,3)+64*a(0,4)]/256$$
$$b(1,0)=[64*a(0,0)+192*a(1,0)]/256$$
$$b(1,1)=[16*a(0,0)+48*a(0,1)+48*a(1,0)+144*a(1,1)]/256$$
$$b(1,2)=[24*a(0,1)+40*a(0,2)+72*a(1,1)+120*a(1,2)]/256$$
$$b(1,3)=[40*a(0,2)+24*a(0,3)+120*a(1,2)+72*a(1,3)]/256$$
$$b(1,4)=[48*a(0,3)+16*a(0,4)+144*a(1,3)+48*a(1,4)]/256$$
$$b(2,0)=[96*a(1,0)+160*a(2,0)]/256$$
$$b(2,1)=[24*a(1,0)+72*a(1,1)+40*a(2,0)+120*a(2,1)]/256$$
$$b(2,2)=[36*a(1,1)+60*a(1,2)+60*a(2,1)+100*a(2,2)]/256$$
$$b(2,3)=[60*a(1,2)+36*a(1,3)+100*a(2,2)+60*a(2,3)]/256$$
$$b(2,4)=[72*a(1,3)+24*a(1,4)+120*a(2,3)+40*a(2,4)]/256$$
$$b(3,0)=[160*a(2,0)+96*a(3,0)]/256$$
$$b(3,1)=[40*a(2,0)+120*a(2,1)+24*a(3,0)+72*a(3,1)]/256$$
$$b(3,2)=[60*a(2,1)+100*a(2,2)+36*a(3,1)+60*a(3,2)]/256$$
$$b(3,3)=[100*a(2,2)+60*a(2,3)+60*a(3,2)+36*a(3,3)]/256$$
$$b(3,4)=[120*a(2,3)+40*a(2,4)+72*a(3,3)+24*a(3,4)]/256$$
$$b(4,0)=[192*a(3,0)+64*a(4,0)]/256$$
$$b(4,1)=[48*a(3,0)+144*a(3,1)+16*a(4,0)+48*a(4,1)]/256$$
$$b(4,2)=[72*a(3,1)+120*a(3,2)+24*a(4,1)+40*a(4,2)]/256$$
$$b(4,3)=[120*a(3,2)+72*a(3,3)+40*a(4,2)+24*a(4,3)]/256$$
$$b(4,4)=[144*a(3,3)+48*a(3,4)+48*a(4,3)+16*a(4,4)]/256$$

When the main magnification is 150%, the original pixel size is 2×2 (with 3×3 neighbor pixels needed for support) and the new pixel size is 3×3:

$$b(0,0)=[255*a(0,0)+a(0,1)]/256$$
$$b(0,1)=[96*a(0,0)+160*a(0,1)]/256$$
$$b(0,2)=[160*a(0,1)+96*a(0,2)]/256$$

$b(1,0)=[96*a(0,0)+160*a(1,0)]/256$ $b(1,1)=[36*a(0,0)+60*a(0,1)+60*a(1,0)+100*a(1,1)]/256$ $b(1,2)=[60*a(0,1)+100*a(0,2)+36*a(1,1)+60*a(1,2)]/256$ $b(2,0)=[160*a(1,0)+96*a(2,0)]/256$ $b(2,1)=[60*a(1,0)+100*a(1,1)+36*a(2,0)+60*a(2,1)]/256$ $b(2,2)=[100*a(1,1)+60*a(1,2)+60*a(2,1)+36*a(2,2)]/256$

When the main magnification is 200%, the original pixel size is 1×1 (with 2×2 neighbor pixels needed for support), and the new pixel size is 2×2:

$b(0,0)=[255*a(0,0)+a(0,1)]/256$ $b(0,1)=[128*a(0,0)+128*a(0,1)]/256$ $b(1,0)=[128*a(0,0)+128*a(1,0)]/256$ $b(1,1)=[64*a(0,0)+64*a(0,1)+64*a(1,0)+64*a(1,1)]/256$

When the main magnification is 250%, the original pixel size is 2×2 (with 3×3 neighbor pixels needed for support), and the new pixel size is 5×5:

$b(0,0)=[255*a(0,0)+a(0,1)]/256$ $b(0,1)=[160*a(0,0)+196*a(0,1)]/256$ $b(0,2)=[64*a(0,0)+192*a(0,1)]/256$ $b(0,3)=[192*a(0,1)+64*a(0,2)]/256$ $b(0,4)=[96*a(0,1)+160*a(0,2)]/256$ $b(1,0)=[160*a(0,0)+96*a(1,0)]/256$ $b(1,1)=[100*a(0,0)+60*a(0,1)+60*a(1,0)+36*a(1,1)]/256$ $b(1,2)=[40*a(0,0)+120*a(0,1)+24*a(1,0)+72*a(1,1)]/256$ $b(1,3)=[120*a(0,1)+40*a(0,2)+72*a(1,1)+24*a(1,2)]/256$ $b(1,4)=[60*a(0,1)+100*a(0,2)+36*a(1,1)+60*a(1,2)]/256$ $b(2,0)=[64*a(0,0)+192*a(1,0)]/256$ $b(2,1)=[40*a(0,0)+24*a(0,1)+120*a(1,0)+72*a(1,1)]/256$ $b(2,2)=[16*a(0,0)+48*a(0,1)+48*a(1,0)+144*a(1,1)]/256$ $b(2,3)=[48*a(0,1)+16*a(0,2)+144*a(1,1)+48*a(1,2)]/256$ $b(2,4)=[24*a(0,1)+40*a(0,2)+72*a(1,1)+120*a(1,2)]/256$ $b(3,0)=[192*a(1,0)+64*a(2,0)]/256$ $b(3,1)=[120*a(1,0)+72*a(1,1)+40*a(2,0)+24*a(2,1)]/256$ $b(3,2)=[48*a(1,0)+144*a(1,1)+16*a(2,0)+48*a(2,1)]/256$ $b(3,3)=[144*a(1,1)+48*a(1,2)+48*a(2,1)+16*a(2,2)]/256$ $b(3,4)=[72*a(1,1)+120*a(1,2)+24*a(2,1)+40*a(2,2)]/256$ $b(4,0)=[96*a(1,0)+160*a(2,0)]/256$ $b(4,1)=[60*a(1,0)+36*a(1,1)+100*a(24,0)+60*a(2,1)]/256$ $b(4,2)=[24*a(1,0)+72*a(1,1)+40*a(2,0)+120*a(2,1)]/256$ $b(4,3)=[72*a(1,1)+24*a(1,2)+120*a(2,1)+40*a(2,2)]/256$ $b(4,4)=[36*a(1,1)+60*a(1,2)+60*a(2,1)+100*a(2,2)]/256$

When the main magnification is 300%, the original pixel size is 1×1 (with 2×2 neighbor pixels needed for support), and the new pixel size is 3×3:

$b(0,0)=[255*a(0,0)+a(0,1)]/256$ $b(0,1)=[160*a(0,0)+96*a(0,1)]/256$ $b(0,2)=[96*a(0,0)+160*a(0,1)]/256$ $b(1,0)=[160*a(0,0)+96*a(1,0)]/256$ $b(1,1)=[100*a(0,0)+60*a(0,1)+60*a(1,0)+36*a(1,1)]/256$ $b(1,2)=[60*a(0,0)+100*a(0,1)+36*a(1,0)+60*a(1,1)]/256$ $b(2,0)=[96*a(0,0)+160*a(1,0)]/256$ $b(2,1)=[60*a(0,0)+36*a(0,1)+100*a(1,0)+60*a(1,1)]/256$ $b(2,2)=[36*a(0,0)+60*a(0,1)+60*a(1,0)+100*a(1,1)]/256$

When the main magnification is 400%, the original pixel size is 1×1 (with 2×2 neighbor pixels needed for support), and the new pixel size is 4×4:

$b(0,0)[255*a(0,0)+a\ (0,1)]/256$ $b(0,1)=[192*a(0,0)+64*a(0,1)]/256$ $b(0,2)=[128*a(0,0)+128*a(0,1)]/256$ $b(0,3)=[64*a(0,0)+192*a(0,1)]/256$ $b(1,0)=[192*a(0,0)+64*a(1,0)]/256$ $b(1,1)=[144*a(0,0)+48*a(0,1)+48*a(1,0)+16*a(1,1)]/256$ $b(1,2)=[96*a(0,0)+96*a(0,1)+32*a(1,0)+32*a(1,1)]/256$ $b(1,3)=[48*a(0,0)+144*a(0,1)+16*a(1,1)+48*a(1,1)]/256$ $b(2,0)=[128*a(0,0)+128*a(1,0)]/256$ $b(2,1)=[96*a(0,0)+32*a(0,1)+96*a(1,0)+32*a(1,1)]/256$ $b(2,2)=[64*a(0,0)+64*a(0,1)+64*a(1,0)+64*a(1,1)]/256$ $b(2,3)=[32*a(0,0)+96*a(0,1)+32*a(1,0)+96*a(1,1)]/256$ $b(3,0)=[64*a(0,0)+192*a(1,0)]/256$ $b(3,1)=[48*a(0,0)+16*a(0,1)+144*a(1,0)+48*a(1,1)]/256$ $b(3,2)=[32*a(0,0)+32*a(0,1)+96*a(1,0)+96*a(1,1)]/256$ $b(3,3)=[16*a(0,0)+48*a(0,1)+48*a(1,0)+144*a(1,1)]/256$

FIG. 3 shows one color channel of the image scaler 14, including four multipliers 30 for generating respective products of the selected pixels a and the corresponding weighting parameters P. A pair of adders 32 combines pairs of the products, an additional adder 32 producing the resulting sum which is fed to an 8-bit shifter 34 for performing the division by 256 to produce a main scale pixel value X. It will be understood that the shifter 34 can be implemented by utilizing only the high-order 8-bits of a parallel adder output as the value X. The values X are then fed to respective pixel and line dropping circuits 36 and 38 for equal distance pixel elimination in cases wherein the actual scaling factor F is not equal to one of the predefined scaling factors of 25%, 50%, 75%, 100%, 125%, 150%, 200%, 250%, 300%, or 400%. The pixel dropping circuit includes a 9-bit dropping counter 40 having a pixel clock input and an underflow output to an AND gate array 42 that also sequentially receives the X values to produce a pixel-gated subset of the X data. Similarly, the line dropping circuit 38 includes counterparts of the dropping counter 40 and the AND gate array 42, the counter 40 thereof having a line clock input and producing an underflow output to the associated AND gate array 42, the gate array 42 receiving the associated underflow signal and the pixel-gated X values and producing output data from which evenly spaced pixels and/or lines are omitted.

At each underflow, the counters 40 of the pixel and line dropping circuits 36 and 38 are loaded, respectively, with values DP and DL, those values being generated in the CPU 28 and transferred to internal buffers of the respective dropping counters 40. In the following formulas, the scaling factor, F, is assumed to be the same in the horizontal and vertical directions, the DP and DL values consequently being the same.

IF F=PF, then DP=DL=0,
 ELSE DP=DL=[PF+(PF−F)−1]/(PF−F)
  (Rounded up), wherein PF is the next bigger predefined scaling factor.

The CPU 28 also performs additional operations, listed below, for defining printed output image boundaries.

$$OW=[(IW*F/100)+31]/32,$$

wherein IW is the input image width and OW is the output image width (word count).

$$IF\ OW \geq PW,\ then\ OW=PW\ and\ MA=0,$$

wherein PW is the printable width (word count) and MA is the number of bits to be masked from the right side of the last OW word.

$$IF\ OW<PW,\ then\ MA32 - [(IW*F/100)\ mode\ 32]$$

$$OH=IH*F/100,$$

wherein OH is the output image height (line) and IH is the input image height (line).

$$IF\ OH \geq PH,\ then\ OH=PH,$$

wherein PH is the printable page height (line).

Image Enhancement

Figure 5:
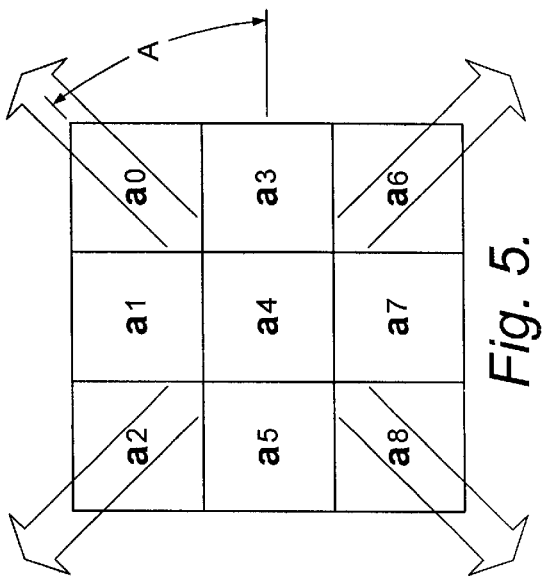
FIG. 5 is a diagram showing neighbor pixels used in the image enhancement channel portion of FIG. 4.

The image enhancer 16 operates in realtime to sharpen the scaled image, the degree of sharpening being set by a control variable from the CPU 28, typically in response to operator input. As shown in FIG. 5, diagonally adjacent neighbor pixels a0, a2, a6, and a8, of a central pixel a4 are utilized for image enhancement in preference to orthogonally adjacent pixels. When the scaled pixel pitch is the same vertically and horizontally, an angle A of the diagonal from the horizontal is 45°. In this way, the present invention uniquely takes advantage of the human eye being less sensitive to diagonal geometries than to vertical and horizontal geometries. In an exemplary configuration, the control variable (m in the following equations) is passed to the enhancer 16 as a 4-bit value B that is bounded by 0 and 12. An enhanced or new value of the central pixel is $$a4 = [(8+4m)*a4 - m*(a0+a2+a6+a8)]/8$$
$$= [A*a4 - B*(a0+a2+a6+a8)]/8$$

where A=(8+4m)=(8+4B) is a 6-bit value bounded by 8 and 56. The value A can be generated in hardware external to the CPU 28 or calculated in the CPU and passed in like manner as the value B. FIG. 4 shows a hardware circuit of one channel of the image enhancer 16, including three cascaded adders 44A, 44B, and 44C for generating the sum (a0+a2+a6+a8) as a 10-bit value; respective multipliers 44A and 44B for generating the products of the above sum and B, and a4*A as 14-bit values; a subtractor 48 for producing the new value of a4, and a clipper 49 for limiting that value to 8-bits, bounded by 0 and 255. The enhanced and clipped pixel data is sequentially passed to the CMS 17.

Color Management

Figure 6:
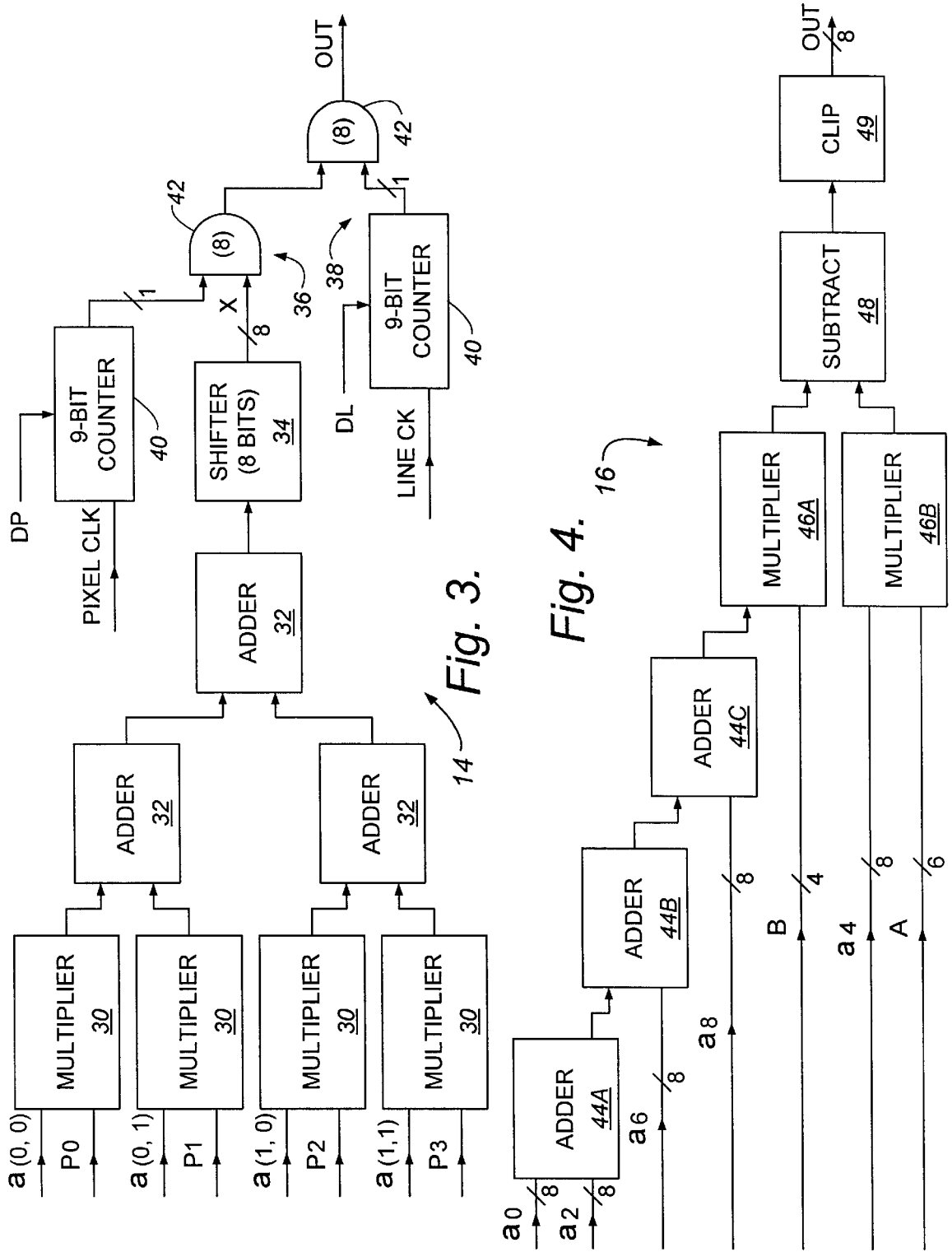
FIG. 6 is a block diagram of a color management system portion of the RIP of FIG. 2.

The color management subsystem 17 provides realtime correction/matching of color images from RGB to CMYK color space between scanning and printing devices. For each color pixel (in Red, Green, and Blue 8-bit values), its eight neighbor pixels are obtained in three-dimensional space from the upper 4 bits of data; then interpolation is performed according to the lower 4 bits of data to obtain a new value for each of respective CMYK data bytes. As shown in FIG. 6, the subsystem 17 includes respective shifters 50 for accessing the high-order nibbles of corresponding R, G, and B values, the shifters 50 driving respective inputs of an address multiplexer 52. The shifters 50 also drive additional inputs of the multiplexer 52 through respective incrementers 54, the multiplexer selectively addressing a color lookup table memory 56 in response to the high-order RGB data as described below.

The lookup table memory 56 is three-dimensional, having a size of 17×17×17 32-bit words, being first loaded with appropriate conversion values. In each entry of the lookup table, there are 4 bytes of data that contain respective CMYK values. From the upper 4 bits of each of the RGB data values, the multiplexer 52 is sequenced by appropriate select inputs for addressing eight neighbor pixels (a0, a1, a2, a3, a4, a5, a6, a7), each address producing corresponding CMYK data bytes. The new value is then obtained by interpolating the eight neighbor pixels in an interpolator 58, respective channels thereof being designated 58C, 58M, 58Y, and 58K in FIG. 6.

Figure 7:
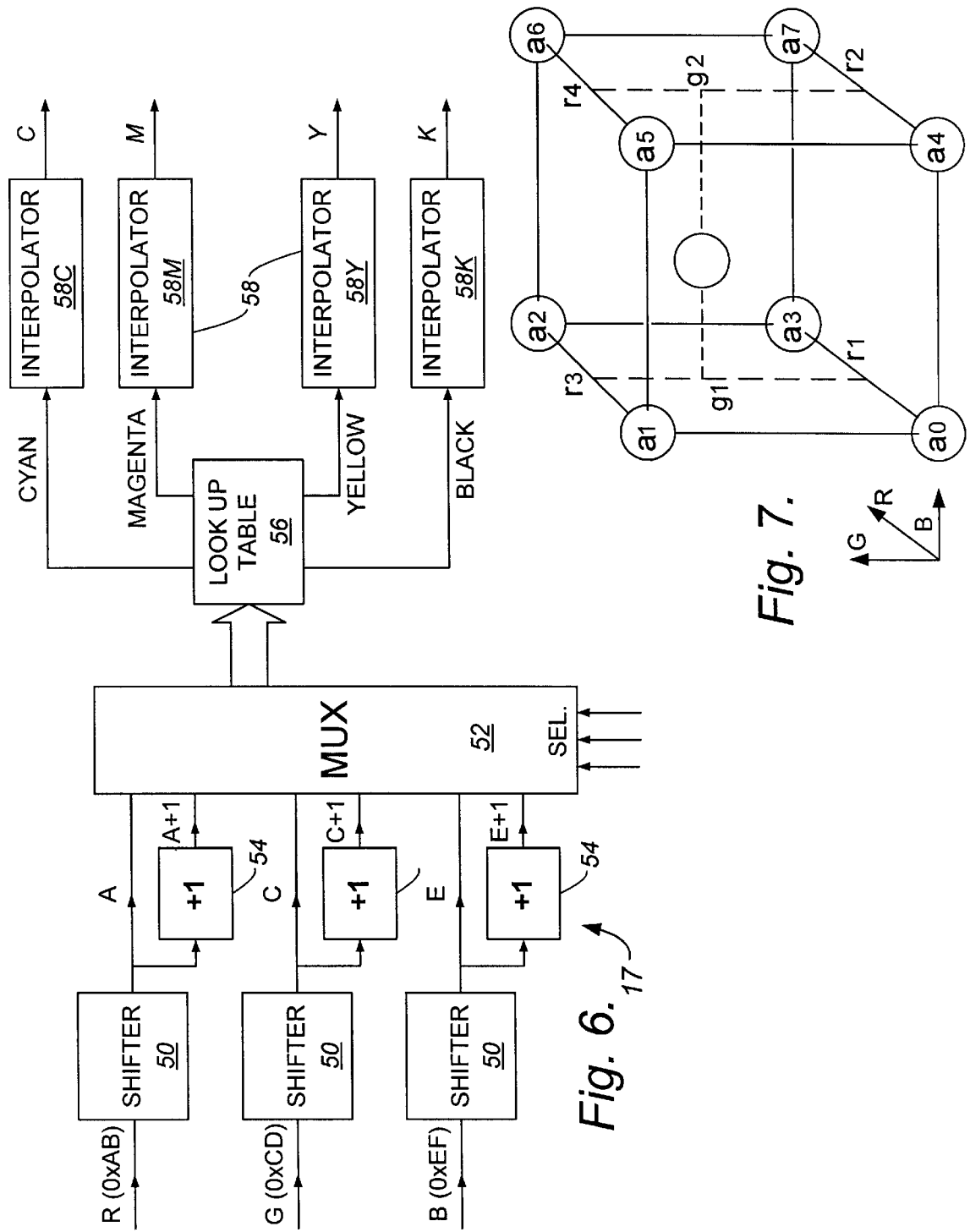
FIG. 7 is a diagram depicting 3-dimensional color interpolation in the color management system portion of FIG. 6.

Denoting the RGB value from the lookup table 56 as (0xAB, 0xCD, 0xEF), a0 is at the location of (0xA, 0xC, 0xE), a1 is at the location (0xA, 0xC+1, 0xE), a2 is at (0xa+1, 0xC+1, 0xE), a3 is at location of (0xA+1, 0xC, 0xE), a4 is at the location of (0xA, 0xC, 0xE+1), a5 is at the location of (0xA, 0xC+1, 0xE+1), a6 is at the location of (0xA+1, 0xC+1, 0xE+1), and a7 is at the location of (0xA+1, 0xC, 0xE+1). FIG. 7 shows a three-dimensional depiction of this relationship, wherein a0 represents data rounded down to the high-order four bits.

The new CMYK data is obtained from the lookup values and the original RGB (0xAB, 0xCD, 0xEF) data, according to the following interpolation factors. In each CMYK channel, $$r1=[(16-i\ B)*a0+B*a3]/16$$
$$r2=[(16-B)*a4+B*a7]/16$$
$$r3=[(16-B)*a1+B*a2]/16$$
$$r4=[(16-B)*a5+B*a6]/16$$

In each of the above, the number of bits in the respective terms is 5bits*8bits=12bits, 12bits+12bits=12bits, and 12bits>>2=10bits.

$$g1=[(16-D)*r1+D*r3]/16$$
$$g2=[(16-D)*r2+D*r4]/16$$

In each of the above, the number of bits in the respective terms is 5bits*10bits=14bits, 14bits+14bits=14bits, and 14bits>>4=10bits.

$$New\ Value=[(16-F)*g1+F*g2]/16$$

In the above, there are 5bits*10bits=14bits, 14bits+14bits= 14bits, and 14bits>>6=8bits in the respective terms.

Figure 8:
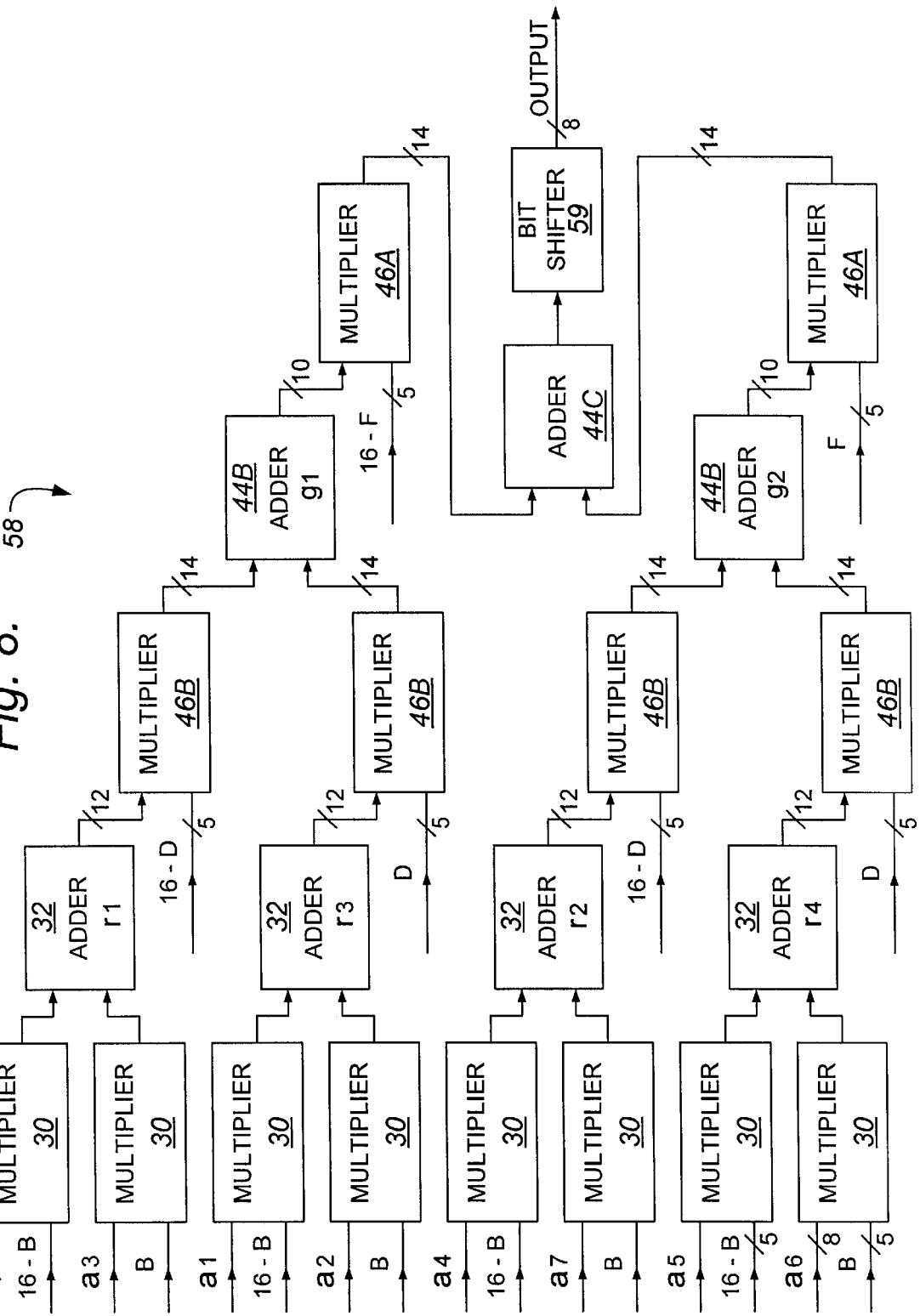
FIG. 8 is a block diagram of an interpolation channel of the system portion of FIG. 6.

As shown in FIG. 8, each interpolator channel 58 includes eight counterparts of the multiplier 30 feeding four counterparts of the adder 32 for producing the respective values of r1, r2, r3, and r4, followed by four counterparts of the multiplier 46A and two counterparts of the adder 44B for producing the values g1 and g2. There are two more multipliers 46A and a counterpart of the adder 44C for producing the new value, which is then shifted six bit positions in a shifter 59 to obtain a scaled output for that channel. It will be understood that the above formula can also be simplified as follows:

New Value=$[(16-F)(16-D)*r1+(16-F)D*r3+F(16-D)*r2+FD*r4]/256$

Figure 9:
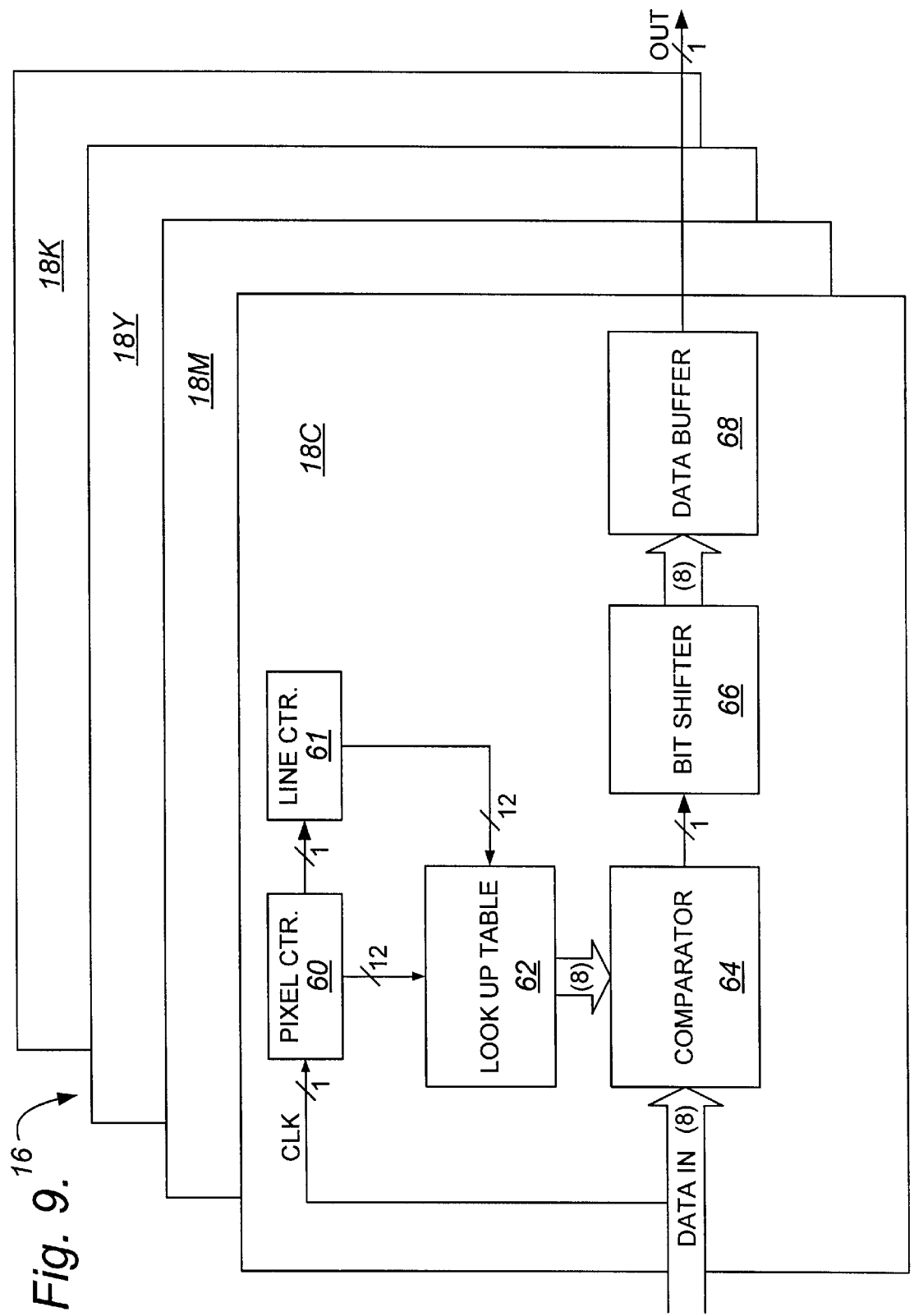
FIG. 9 is a block diagram of a halftone portion of the RIP of FIG. 2.

New Value=$[(16-F)(16-D)(16-B)*a0+(16-F)(16-D)(B)*a3+(16-F)(D)(16-B)*a1+(16-F)(D)(B)*a2$
$+(F)(16-D)(16-B)*a4+(F)(16-D)(B)*a7+(F)(D)(16-B)*a5+(F)(D)(B)*a6]/(256*16)$ Halftone The halftoning generator 18 is provides realtime conversion of color images from 8 bits to 1 bit per channel. For each color pixel (having separate eight-bit values for Cyan, Magenta, Yellow, and Black), a related halftone value is obtained from a stored pattern and a comparison is performed. For example, 8 bits of data (an, . . . ,a3, a2, a1, a0) are comparted with 8 bits of halftone pattern (bm, . . . , b3, b2, b1, b0) and generate one bit data (cn, . . . , c3, c2, c1, c0). As shown in FIG. 9, the input data is fed to respective pixel and line counters 60 and 61, the outputs of which are used to address a halftone lookup table 62 that contains 8 bits of halftone pattern data per pixel address. The input data is also fed to an eight-bit comparator 64 together with the corresponding halftone pattern data, the comparator 64 producing a one-bit output per pixel. The output data is buffered by first accumulating bits from the comparator 64 in an eight-bit shift register 66, eight bits at a time being transferred to a data buffer 68 (also identified in FIG. 2 as the output buffer 20) from which one bit at a time per channel is retrieved during printing.

Although the present invention has been described in considerable detail with reference to certain preferred versions thereof, other versions are possible. For example, the ROC 12 can incorporate an image centering subsystem for determining proper image offsets to print in the center of the page. Therefore, the spirit and scope of the appended claims should not necessarily be limited to the description of the preferred versions contained herein.

What is claimed is:

1. A system for scaling an input image defined by an array of source pixels to produce an array of scaled pixels, comprising:
   (a) a memory for storing the source pixels;
   (b) means for receiving a scale factor within a predetermined scale factor range;
   (c) means for selecting an interim scale factor from a numerically spaced set of predefined main scale factors, the predefined main scale factors being spaced from a low end of the predetermined scale factor range, one of the predefined main scale factors being at a high end of the predetermined scale factor range, the interim scale factor being that nearest the received scale factor in the direction of the high end of the predetermined scale factor range.

2. The system of claim 1, wherein the predetermined scale factor range is from not more than 10 percent to not less than 200 percent, there being at least 5 of the predefined scale factors.

3. The system of claim 2, wherein the received scale factor is specifiable in 1 percent increments.

4. The system of claim 2, wherein the predefined scale factors are spaced by not more than 25 percent for scale factors not exceeding 150 percent.

5. The system of claim 4, wherein the predetermined scale factor range extends to 400 percent, the predefined scale factors including percentages of 25, 50, 75, 100, 125, 150, 200, 250, 300, and 400.

6. The system of claim 1, wherein the image is a color image, each of the pixels having at least three color components.

7. The system of claim 6, wherein the at least three color components comprise red, green, and blue.

8. The system of claim 1, wherein the subset of source pixels is a square array having a source dimension selected from the set consisting of 1, 2, and 4, and the corresponding subset of intermediate pixel data is also a square array having a destination dimension selected from the set consisting of 1, 2, 3, 4, and 5, the destination and source dimensions having a ratio matching the intrim scale factor.

9. The system of claim 8, wherein the destination and source dimensions define the ratio of destination and source dimensions as a reduced fraction.

10. The system of claim 8, wherein the one or more functions are of support subsets of the source pixels, each support subset including a corresponding source subset and having a support dimension being not more than one greater than the source dimension.

11. The system of claim 1, further comprising means for enhancing the scaled pixels using a weighting factor applied to values of diagonally adjacent pixels of respective center pixels.

12. The system of claim 11, wherein the means for enhancing comprises means for augmenting an initial value of the center pixel by an amount proportional to the weighting factor and diminishing the value of the center pixel by an amount proportional to an average value of the diagonally adjacent pixels.

13. The system of claim 11, wherein the weighting factor is variable in response to an external input.

14. A system for converting a color image defined by an array of source pixels having red, green, and blue color components to produce an array of output pixels, each of the output pixels having cyan, magenta, yellow and black components, the system comprising:
   (a) a memory for storing the source pixels;
   (b) a 3-D lookup table containing CMYK values corresponding to respective RGB values;
   (c) means for addressing the 3-D lookup table with high-order value portions of the source pixels to obtain corresponding sets of intermediate CMYK values, the addresses of the source pixels corresponding to high-order RGB value portions of the source pixels being selectively incremented and unchanged to obtain neighboring high-order RGB value portions; and
   (d) means for interpolating the intermediate CMYK values using respective low-order RGB value portions of the source pixels, the interpolating means comprising, for each CMYK values of each corresponding set with the low-order RGB value portions, selectively positively or negatively proportional for each of the RGB color components in different combinations for particular ones of the neighboring high-order value portions of the source RGB pixels.

15. The system of claim 14, wherein the means for addressing the lookup table comprises a multiplexer having as inputs the high-order RGB value portions of the source pixels, and further inputs being incremented counterparts of the high-order RGB value portions, the multiplexer being sequenced between combinations of the value portions and the incremented value portions of each color component to obtain a plurality of addresses corresponding to the high-order value portions, each of the pluralities of addresses producing one of the corresponding sets of intermediate CMYK values.

16. A system for scaling a color input image defined by an array of source pixels to produce an array of output pixels, each of the source pixels having red, green, and blue color components, the system comprising:

(a) a memory for storing the source pixels;

(b) means for receiving a scale factor within a predetermined scale factor range of from not more than 10 percent to not less than 200 percent, the received scale factor being specifiable in 1 percent increments;

(c) means for selecting an interim scale factor from a numerically spaced set of predefined main scale factors, the main scale factors being spaced from a low end of the predetermined scale factor range, one of the predefined main scale factors being at a high end of the predetermined scale factor range, the predefined main scale factors including percentages of 25, 50, 75, 100, 125, 150, and 200, the interim scale factor being the predefined scale factor that is nearest the received scale factor in the direction of the high end of the predetermined scale factor range;

(d) means for determining, for the interim scale factor, a pixel transformation between a subset of the source pixels and a corresponding subset of intermediate pixel data as one or more scale functions of source pixel values;

(e) means for producing the intermediate pixel data from the source pixels using the interim scale factor and the one or more scale functions;

(f) means for interpolating the intermediate pixel data to produce a set of scaled pixels by dropping an evely spaced subset of the intermediate pixel data when the received scale factor is less than the interim scale factor;

(g) means for deriving a set of enhanced pixels from the set of scaled pixels, comprising:
  (i) means for storing an enhancement value;
  (ii) means for determining, for each of the scaled pixels, an enhanced pixel value being a value of the scaled pixel modified proportionally to the enhancement value and oppositely proportional to an average value of diagonally adjacent ones of the scaled pixels; and
  (iii) means for storing the enhanced pixel values as a set of enhanced pixels having respective red, green and blue color components; and (h) means for converting the enhanced pixels from RGB to CMYK, comprising:

(i) a 3-D lookup table containing CMYK values corresponding to a respective RGB values;
  (ii) means for addressing the 3-D lookup table with high-order value portions of the enhanced pixels to obtain corresponding sets of intermediate CMYK values, the addressing means comprising a multiplexer having as inputs the high-order value portions of the RGB values, and further inputs being incremented counterparts of the high order value portions of the RGB values, the multiplexer being sequenced between combinations of the high order value portions or the incremented value portions of each of the RGB color components to obtain a plurality of addresses corresponding to each possible combination of the high order value portions each of the plurality of addresses producing one of the sets of the intermediate CMYK values; and
  (iii) means for interpolating the intermediate CMYK values using respective low-order value portions of the enhanced pixels, comprising an array of multipliers and adders for combining respective ones of the intermediate CMYK values of each set with the low-order value portions of the enhanced pixels selectively or negatively proportional for each of the RGB color components in different combinations according to member positions in the intermediate CMYK value sets.

17. The system of claim 16, wherein the predetermined scale factor range extends to 400 percent, the predefined scale factors further including percentages of 250, 300, and 400.

18. A method for scaling an image defined by an array of source pixels to produce an array of output pixels according to a received scale factor being within a predetermined range, the method comprising:

(a) storing the source pixels;

(b) selecting an interim scale factor from a numerically spaced set of predefined main scale factors being spaced from a low end of the predetermined range one of the predefined main scale factors being at a high end of the predetermined range, the interim scale factor being that nearest the received scale factor in the direction of the high end of the predetermined range;

(c) producing an intermediate pixel array by pixel transformations between subsets of the source pixels and corresponding subsets of intermediate pixel data using one or more scare functions of source pixel values associated with the interim scale factor; and (d) interpolating the intermediate pixel data when the received scale factor is less than the interim scale factor to produce the output pixels by dropping an evely spaced subset of the intermediate pixel data.

19. The method of claim 18, wherein the image is a color image, and the storing, producing, and interpolating is performed simultaneously for each of at least three color components of the image.

* * * * *